United States Patent [19]
Numata et al.

[11] 3,872,483
[45] Mar. 18, 1975

[54] DEVICE FOR INDICATING DIGITAL EXPOSURE INFORMATION IN THE VIEWFINDER OF A CAMERA

[75] Inventors: Saburo Numata, Urawa; Iwao Sagara; Hirohisa Shishikura, both of Tokyo, all of Japan

[73] Assignees: Fuji Photo Optical Co., Ltd., Omija-shi; Oki Electric Industry Co., Ltd., Tokyo, both of Japan

[22] Filed: July 29, 1974

[21] Appl. No.: 492,909

[30] Foreign Application Priority Data
July 28, 1973 Japan.............................. 48-85167

[52] U.S. Cl. ................................................ 354/53
[51] Int. Cl. ............................................. G01j 1/00
[58] Field of Search ....... 354/53, 273, 289; 352/171

[56] References Cited
UNITED STATES PATENTS
3,727,527  4/1973  Borowski .............................. 354/53
3,818,495  6/1974  Sagara .................................. 354/53

Primary Examiner—Monroe H. Hayes
Attorney, Agent, or Firm—Harold L. Stults

[57] ABSTRACT

Analogue information from an exposure meter indicative of an exposure factor is converted to digital information by an A-D converter. The sampling period of A-D conversion of the A-D converter is set to be equal to or longer than 0.2 second. The digital information is indicated by a digital indicator in the viewfinder of the camera. The sampling period is preferably shorter than one second.

5 Claims, 5 Drawing Figures

FIG. 1
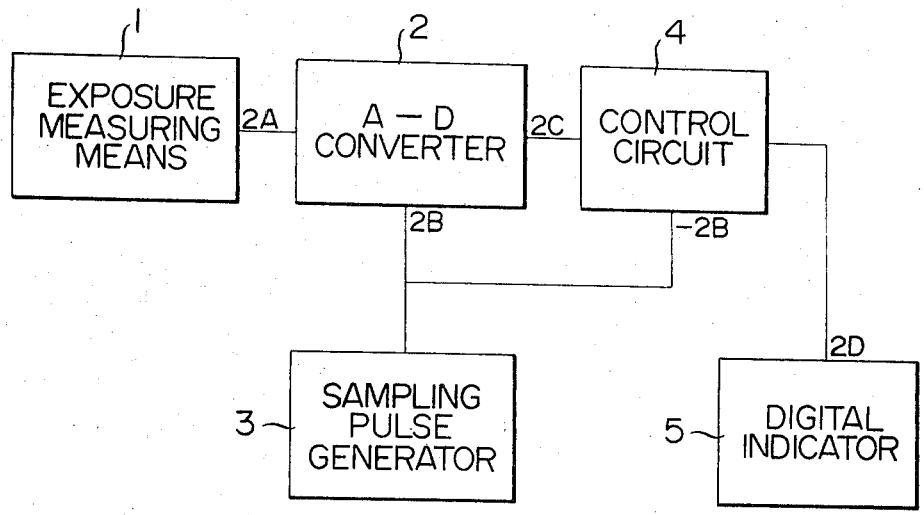
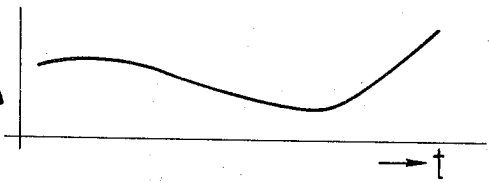
FIG. 2A
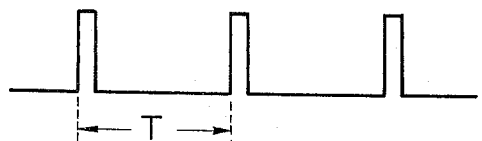
FIG. 2B
FIG. 2C
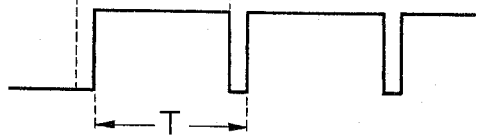
FIG. 2D

DEVICE FOR INDICATING DIGITAL EXPOSURE INFORMATION IN THE VIEWFINDER OF A CAMERA

BACKGROUND OF THE INVENTION

1. Field of the Invention

This invention relates to a device for indicating digital information in a viewfinder of a camera, and more particularly to a device for indicating exposure information such as shutter speed or size of the diaphragm aperture in a digital form in the viewfinder of the camera.

2. Description of the Prior Art

Generally, in a photographic camera provided with an automatic exposure control means such as an electric shutter or an automatically controlled diaphragm, the exposure information such as the shutter speed and the size of the diaphragm aperture should preferably be known to the photographer. This is because the photographer sometimes wishes to know if the shutter speed controlled is sufficiently high to obtain a photograph without blur and if the size of the diaphragm aperture is sufficiently small to obtain a sharp photograph with a sufficiently long focal depth. Further, photographers sometimes wish to keep a record of the actual shutter speed and diaphragm aperture size.

In order to comply with the above-mentioned requirements in the conventional cameras with an exposure control means in which the diaphragm is automatically controlled in accordance with the illumination, it has been known to provide an exposure meter in the vicinity of the viewfinder of the camera and locate the pointer of the exposure meter in the visual field of the viewfinder so that the actually controlled diaphragm aperture size may be indicated by the pointer in the viewfinder. It has also been proposed to indicate the exposure information in a digital form by use of a digital information indicating means provided in the viewfinder and connected with a light measuring circuit including a photodetector to receive light from the object to be photographed. In the digital information indicating means as described above, a number of light emitting segments made of light emitting diodes arranged in the shape of numerals are used to indicate the information in a digital form. The exposure information from the light measuring circuit in an analogue form is converted to a digital output through an A-D converter and is selectively transmitted to the light emitting segments through a control circuit including a decoder.

The above described digital information indicating means used in the imposssible has a defect as follows. The digital information indicating means changes its indication of the exposure information in response to changes in the illumination of brightness of the object to be photographed. When the brightness changes abruptly, the indication also changes abruptly. Therefore, if the brightness of the object fluctuates with a high frequency between two levels which are indicated by different digital indications, two digital indications alternately appear in the viewfinder. If the period of fluctuation is short, i.e., shorter than 0.2 sec., the two different digital indications alternately appearing in the viewfinder appear overlapped to the eye of the photographer, and accordingly, it is almost imposssible for the photographer to distinguish between the two indications. For instance, when a digital indicating means comprising seven light emitting segments arranged in the shape of the numeral "8" alternately indicates "500" which indicates that the controlled shutter speed is 1/500 sec. and "250" which indicates the shutter speed of 1/250 sec. alternately with a high frequency, the digital indication recognized by the sense of sight from the overlapped 500 and 250 may for instance be 880.

SUMMARY OF THE INVENTION

In light of the above described defect inherent in the conventional digital exposure information indicating means in a photographic camera, the primary object of the present invention is to provide a device for indicating digital exposure information in a viewfinder of a camera in which the indication does not change when the brightness of the object fluctuates with such a high frequency that the photographer's eye cannot follow the change of indication.

The digital exposure information indicating device in accordance with the present invention employs an A-D converter to convert an analogue value from an exposure measuring circuit to a digital value to be indicated in the viewfinder by a digital information indicating means. The sampling period of the A-D conversion of the A-D converter is set to be equal to or longer than the time required for the sense of sight to distinguish between two alternately appearing digital indications so that the digital information indicated by the indicating means will not change for a period at least as long as that required for the eye to distinguish the indication even if the input analogue information changes. According to our experiments, said time required for distinction of each of two alternately appearing digital indications is longer than the image retention time of the eye. Whereas the human eye is known to retain an image for about 0.05 second, the time required for the sense of sight to distinguish each of two alternately appearing different digital indications has experimentally been proved to be about 0.2 second.

The digital exposure information indicating device in accordance with the present invention is, therefore, characterized in that the sampling period of A-D conversion from the analogue exposure information to the digital exposure information is equal to or longer than 0.2 second.

The above and other objects and features of the present invention will be made apparent from the following detailed description of the preferred embodiment thereof taken in conjunction with the accompanying drawings as follows.

BRIEF DESCRIPTION OF THE PREFERRED EMBODIMENT

FIG. 1 is a block diagram illustrating an embodiment of the exposure information indicating device in accordance with the present invention, FIG. 2A is a graphical representation showing an analogue output generated from the light measuring means employed in the invention, FIG. 2B is a graphical representation showing pulses generated from the sampling pulse generator employed in the invention, FIG. 2C is a graphical representation showing a digital output generated from the A-D converter employed in the invention, and FIG. 2D is a graphical representation showing the final output current in the digital information indicating means.

DESCRIPTION OF THE PREFERRED EMBODIMENT

Referring to FIG. 1 which shows the construction of the exposure information indicating device in accordance with the present invention, there is used an exposure measuring means 1 including a photodetector such as a cadmium sulfide element to receive light from the object to be photographed and an analogue output circuit connected with said photodetector to generate an analogue output in accordance with the amount of light received by the photodetector. The output current of the exposure measuring means 1 is illustrated in FIG. 2A. The exposure measuring means 1 includes an exposure factor setting means which is, for instance, a variable resistor which is associated with and controlled by a diaphragm setting ring so that the output of the exposure measuring means may represent the exposure condition in terms of a shutter speed. An A-D converter 2 connected with the exposure measuring means 1 for converting the analogue output 2A to a digital output 2c is controlled by a sampling pulse generator 3. The sampling pulse generator 3 comprises, for instance, a pulse oscillator and a frequency divider, and generates sampling pulses as illustrated in FIG. 2B. The sampling pulses are transmitted to the A-D converter 2 so that the A-D converter 2 may generate a digital output 2C only when it receives the sampling pulses. Accordingly, the output of the A-D converter 2 is generated at the predetermined intervals corresponding to the intervals of the sampling pulses generated by the pulse generator 3. The interval or period of the sampling pulses is set to be equal to or longer than 0.2 second based on the consideration mentioned above. The interval of the pulses, however, must not be too long, because the digital information indicated is desired to follow the actually controlled exposure factor as faithfully as possible. From this viewpoint, the interval or period of the pulses should preferably be shorter than one second. Therefore, the period of the sampling pulses generated from the pulse generator 3 is preferably made longer than 0.2 second and shorter than 1.0 second. The digital output 2C generated from the A-D converter 2 and sampling pulses 2B generated from the pulse generator 3 are transmitted to a control circuit 4, which selectively energizes light emitting segments in a digital information indicating means 5 in accordance with the input thereinto. The control circuit 4 includes a decoder, latches, and ROMs for selectively energizing a plurality of light emitting segments in the digital information indicating means 5 to make a digital indication in accordance with the digital output 2C from the A-D converter 2. In the control circuit 4, the output 2C of the A-D converter is put into a decoder together with the clock pulses 2B through a flip-flop or a one shot multi-vibrator. When a one shot multi-vibrator is used instead of the flip-flop, the time constant thereof is made equal to the period of the sampling pulses. The digital information indicating means 5 comprises light emitting segments made of light emitting diodes arranged in the shape of numerals to indicate such exposure information as shutter speed or size of the diaphragm hole. The light emitting segments are selectively energized by the output of the control circuit 4 to indicate the exposure information in terms of the shutter speed or the size of the diaphragm hole. As shown in the final output current of the digital information indicating means 5 illustrated in FIG. 2D, the energization of the light emitting segments lasts from one pulse to the next. Clock pulses 2B from the pulse generator 3 are transmitted to the control circuit 4 to deenergize the light emitting segments at the same intervals as those of the pulses 2B. Thus, the light emitting segments are energized only between the adjacent sampling pulses.

Since the period of the sampling pulses is made 0.2 seconds or longer, the digital indication of the exposure information made in terms of a shutter speed or a diaphragm hole size does not change at least for the period of 0.2 second. Therefore, there is no fear that the two or more digital indications will appear overlapped with each other to the eye of the photographer. The digital indications obtained by the device in accordance with the present invention can therefore be clearly recognized and distinguished.

We claim:

1. A device for indicating digital exposure information in the viewfinder of a camera comprising an exposure measuring means including a photodetector to receive light from the object to be photographed and generating an analogue output corresponding to the amount of light received by the photodetector, an A-D converter connected with the exposure measuring means for converting said analogue output to a digital output, a sampling pulse generating means connected with the A-D converter for giving sampling pulses to the A-D converter to determine the sampling intervals of A-D conversion of the A-D converter, a digital information indicating means including light emitting segments arranged in the shape of numerals for indicating exposure information in a digital form, and a control circuit connected with said A-D converter, said sampling pulse generating means and said digital information indicating means for converting the digital output from the A-D converter to a signal for selectively energizing said light emitting segments to indicate the digital output in a digital form, the period of said sampling pulses being equal to or longer than 0.2 second.

2. A device for indicating digital exposure information in the viewfinder of a camera as defined in claim 1 wherein said period of the sampling pulses is equal to or shorter than 1.0 second.

3. A device for indicating digital exposure information in the viewfinder of a camera as defined in claim 1 wherein said exposure measuring means includes a diaphragm hole size input means associated with a diaphragm operating means in the camera and generates an analogue output which corresponds to the shutter speed desired to obtain a correct exposure, and said digital information indicating means indicates the exposure information in terms of a shutter speed.

4. A device for indicating digital exposure information in the viewfinder of a camera as defined in claim 1 wherein said exposure measuring means includes a shutter speed input means associated with a shutter speed setting means in the camera and generates an analogue output which corresponds to the diaphragm hole size desired to obtain a correct exposure, and said digital information indicating means indicates the exposure information in terms of a diaphragm hole size.

5. In a photographic camera including an automatic exposure control means in which the shutter speed is automatically controlled in accordance with the output of an exposure measuring means which includes a photodetector and a diaphragm hole size input means, a device for indicating the automatically controlled shutter speed in the viewfinder of the camera comprising:

- an A-D converter connected with said exposure measuring means for converting an analogue output from the exposure measuring means to a digital output indicative of a shutter speed desirable to obtain a correct exposure,
- a sampling pulse generating means connected with the A-D converter for giving sampling pulses to the A-D converter to determine the sampling intervals of A-D conversion thereof, the period of said sampling pulses being 0.2 to 1.0 second,
- a digital information indicating means including light emitting segments arranged in the shape of numerals for indicating a shutter speed in a digital form, and
- a control circuit connected with said A-D converter, said sampling pulse generating means and said digital information indicating means for converting the digital output from the A-D converter to a signal for selectively energizing said light emitting segments to indicate the shutter speed in a digital form.

* * * * *